(12) United States Patent
Fogwill et al.

(10) Patent No.: US 10,852,279 B2
(45) Date of Patent: Dec. 1, 2020

(54) METHOD AND APPARATUS FOR FLAME IONIZATION DETECTION FOR CHROMATOGRAPHY

(71) Applicant: Waters Technologies Corporation, Milford, MA (US)

(72) Inventors: Michael O. Fogwill, South Grafton, MA (US); Joseph D. Michienzi, Plainville, MA (US); Geoff Gerhardt, Woonsocket, RI (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 200 days.

(21) Appl. No.: 16/092,264

(22) PCT Filed: Apr. 19, 2017

(86) PCT No.: PCT/US2017/028386
§ 371 (c)(1),
(2) Date: Oct. 9, 2018

(87) PCT Pub. No.: WO2017/184748
PCT Pub. Date: Oct. 26, 2017

(65) Prior Publication Data
US 2019/0094190 A1 Mar. 28, 2019

Related U.S. Application Data

(60) Provisional application No. 62/324,950, filed on Apr. 20, 2016.

(51) Int. Cl.
*G01N 30/68* (2006.01)
*G01N 30/30* (2006.01)
*G01N 30/02* (2006.01)

(52) U.S. Cl.
CPC ............. *G01N 30/68* (2013.01); *G01N 30/30* (2013.01); *G01N 2030/025* (2013.01)

(58) Field of Classification Search
CPC .. G01N 30/68; G01N 30/30; G01N 2030/025; G01N 30/463; G01N 30/32
(Continued)

(56) References Cited

U.S. PATENT DOCUMENTS

| | | | | | |
|---|---|---|---|---|---|
| 3,301,040 | A | * | 1/1967 | Levy | G01N 30/82 73/23.35 |
| 4,111,554 | A | * | 9/1978 | Colin | G01N 21/72 356/36 |

(Continued)

FOREIGN PATENT DOCUMENTS

| CN | 102735776 A | 10/2012 |
|---|---|---|
| CN | 104395748 A | 3/2015 |

(Continued)

OTHER PUBLICATIONS

International Preliminary Report on Patentability in Application No. PCT/US2017/028386 dated Nov. 1, 2018.
(Continued)

*Primary Examiner* — Octavia Hollington
(74) *Attorney, Agent, or Firm* — Schmeiser, Olsen & Watts LLP; William G. Guerin (57) ABSTRACT

A method for detecting an analyte in a chromatography system includes performing a separation using a mobile phase that includes an organic component. The separation is performed with a primary separation module such as a chromatographic column. A first effluent, from the primary separation module, is modulated so that a fluidic plug containing an amount of the organic component and an analyte is provided to a secondary separation module where a secondary separation is performed. A second effluent, from (Continued)

the secondary separation module, includes temporally-resolved organic component and analyte peaks due to selective retention of the analyte. The second effluent is provided to a flame-based detector which is disabled when the organic modifier peak is received and enabled at least during the time when the analyte peak is received. Thus the analyte can be detected without interference from any response of the detector to the organic component peak.

20 Claims, 8 Drawing Sheets

(58) Field of Classification Search
USPC .......................................................... 73/23.4
See application file for complete search history.

(56) References Cited

U.S. PATENT DOCUMENTS

| | | |
|---|---|---|
| 4,883,504 A | 11/1989 | Gerstel |
| 5,281,256 A | 1/1994 | Sacks et al. |
| 5,492,555 A | 2/1996 | Strunk et al. |
| 7,273,517 B1 * | 9/2007 | Lewis ................ G01N 30/6095 73/23.39 |
| 7,608,818 B2 * | 10/2009 | Miller .................. G01N 27/624 250/281 |
| 7,914,612 B2 | 3/2011 | Rubey et al. |
| 8,414,832 B1 * | 4/2013 | Roques .................. G01N 30/30 422/89 |
| 9,341,604 B2 * | 5/2016 | Fan ....................... G01N 30/463 |
| 9,976,995 B2 * | 5/2018 | Brown .................. G01N 30/62 |
| 10,408,801 B2 * | 9/2019 | Green .................. G01N 30/724 |

FOREIGN PATENT DOCUMENTS

| | | |
|---|---|---|
| CN | 104569242 A | 4/2015 |
| JP | H06201668 A | 7/1994 |
| WO | 03087756 A2 | 10/2003 |

OTHER PUBLICATIONS

International Search Report and Written Opinion in PCT/US2017/028386 dated Jul. 18, 2017; 9 pages.

* cited by examiner

FIG. 8

METHOD AND APPARATUS FOR FLAME IONIZATION DETECTION FOR CHROMATOGRAPHY

RELATED APPLICATION

This application claims the benefit of the earlier filing date of U.S. Provisional Patent Application No. 62/324,950, filed Apr. 20, 2016 and titled "Method and Apparatus for Flame Ionization Detection for Chromatography," the entirety of which is incorporated herein by reference.

FIELD OF THE INVENTION

The invention relates generally to flame ionization detection. More particularly, the invention relates to a method and apparatus enabling flame ionization detection to be performed with a mobile phase having an organic component.

BACKGROUND

Flame-based detection is a common technique used in chromatography (e.g. gas chromatography (GC)) to detect analytes of interest (e.g. organic compounds) in an analyte stream. For instance, a flame ionization detector functions by maintaining a flame via the addition of a combustible fuel (e.g. hydrogen) and an oxidant (e.g. air or oxygen) to the detector. An analyte stream (e.g. the eluent from a GC column) passes through the flame in the flame ionization detector. Compounds that contain a reduced form of carbon (e.g. organic compounds from the analyte stream that contain C—H bonds) are ionized in the flame to produce carbon-based ions and free electrons, while compounds without reduced carbon such as carbon dioxide, nitrogen and noble gases (e.g. helium) do not form free electrons. The newly-generated free electrons are attracted to a positive electrode (e.g. anode) while the carbon-based ions are attracted to a negative electrode (e.g. cathode) above the flame. As the ions and electrons reach their respective electrodes, an electric current is established. The amount of current flow is proportional to the number of carbon atoms entering the flame ionization detector. Accordingly, flame ionization detectors are very selective for, and can accurately measure the presence of, analytes that contain a reduced form of carbon (e.g. organic compounds).

A wide variety of mobile phases are used in chromatography. Chromatography systems use different mobile phase fluids according to the nature of the separation to be performed. For example, carbon dioxide is used as a mobile phase in some chromatography systems. In such systems, the carbon dioxide is often in a supercritical state, near-supercritical state, subcritical state, or liquid state at one or more locations within the chromatography system, such as at the chromatographic column. Using a sensitive flame-based detector, such as a flame ionization detector, in these systems can be advantageous due in part to the universal response of the detector to carbon.

Organic components can be added to the mobile phase to change its properties. For example, modifiers can be added to a carbon dioxide mobile phase to change the mobile phase net polarity and separation characteristics. Although the addition of a modifier can enhance the separation of analytes in a sample, most commonly used modifiers, such as methanol, contain a reduced form of carbon and therefore such modifiers generate a response from the flame-based detector. A modifier can be present in an amount much greater than the analytes of interest throughout most or all of a separation. Consequently, the flame-based detector may respond to the presence of the polar modifier by generating a high level background signal that overwhelms the signal generated in response to the analytes of interest.

SUMMARY

In one aspect, the invention features a method for detecting an analyte in a chromatography system using a flame-based detector. A primary separation is performed using a first mobile phase having a composition that includes an organic component. The primary separation generates a first effluent that includes the organic component and an analyte peak. A secondary separation is performed on a fluidic plug from the first effluent that includes the analyte peak. The secondary separation generates a second effluent that includes an organic component peak and the analyte peak, wherein the organic component peak and the analyte peak are temporally resolved. The second effluent is provided to a flame-based detector. The flame-based detector can be disabled during a time when the organic component peak is received and enabled during a time when the analyte peak is received.

In another aspect, the invention features an apparatus for detecting an analyte in a chromatography system using a flame-based detector. The apparatus includes a flame-based detector, a primary separation module, a secondary separation module, a modulator and a controller. The secondary separation module has an outlet in communication with the flame-based detector. The modulator has an inlet in communication with the primary separation module and an outlet in communication with an inlet of the secondary separation module. The controller is in communication with the flame-based detector and the modulator. The controller configures the modulator to provide a fluidic plug from a first effluent from the primary separation module that contains an analyte peak and an organic component to the secondary separation module. The secondary separation module generates a second effluent having an organic component peak and the analyte peak, wherein the organic component peak and the analyte peak are temporally resolved.

In still another aspect, the invention features an apparatus for detecting an analyte in a chromatography system using a flame-based detector. The apparatus includes a flame-based detector, a first trap, a second trap, a first gas chromatography separation device, a second gas chromatography separation device, a modulator valve and a controller. The first and second gas chromatography devices are each in fluidic communication with the flame-based detector. The modulator valve is in fluidic communication with the first and second traps and the first and second gas chromatography separation devices. The modulator valve is configured to receive a first effluent from a chromatographic column at a first port and to receive a gas chromatography carrier gas at a second port. The modulator valve is switchable between a first state in which the first effluent is directed to flow into the first trap and the gas chromatography carrier gas is directed to flow through the second trap to the second gas chromatography separation device and a second state in which the first effluent is directed to flow into the second trap and the gas chromatography carrier gas is directed to flow through the first trap to the first gas chromatography separation device. The controller is in communication with the flame-based detector and the modulator valve. The controller is configured to switch the modulator valve between the first state and the second state.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

As used herein, "effluent" means the mobile phase that exits a chromatographic column or separation device. For example, an effluent can include the mobile phase and one or more components (e.g., analytes) that may be partially or fully temporally resolved from each other due to differences in their retention times. A "flame-based detector" means any detector that uses a flame to detect analytes present in a mobile phase, including the effluent of a chromatographic separation device. Flame-based detectors include flame ionization detectors and flame photometric detectors. A "fluidic plug" means a discrete continuous portion of a fluid flow. A "modulator," as used herein, means the device or mechanism used to direct or provide a fluidic plug from an effluent of a first chromatographic column or separation device to a second chromatographic column or separation device to enable a secondary separation to be performed on the fluidic plug.

In some chromatography systems the mobile phase is a fluid that is in a gaseous state at ambient or room temperature and pressure, and in a liquid, near-supercritical, subcritical or supercritical state in at least one location within the chromatography system. For example, the mobile phase may be in a subcritical or supercritical state at the column. Optionally, one or more organic components, including, co-solvents or modifiers, may be present in the mobile phase. In one example, if the fluid is pure carbon dioxide, the fluid may be in a supercritical state somewhere within the chromatography system; however, as a modifier such as methanol is added to the carbon dioxide, the solvent mixture may be subcritical at some times and at one or more locations in the system. A fluid which is subcritical, near-supercritical or supercritical while flowing through the chromatographic column may be liquid or gaseous at other locations within the system. Moreover, the fluid pressure may change as the relative amount of modifier changes according to the gradient composition.

In chromatography systems using a mobile phase in a subcritical, supercritical or near-supercritical state, polar modifiers are often added into the mobile phase to improve the separation. Carbon dioxide is a substantially nonpolar mobile phase and is not sufficiently polar to substantially elute some polar analytes from the chromatographic column. Addition of a polar modifier to the carbon dioxide increases the polarity of the mobile phase and allows the mobile phase to dissolve more polar analytes. Consequently, more polar analytes may elute from the chromatographic column and the number of polar analytes that can be separated by the chromatographic column is increased. Examples of commonly used modifiers include methanol, ethanol, isopropanol and acetonitrile.

Flame-based detectors are often used in GC systems. Flame-based detectors respond to chemically-reduced forms of carbon present in the mobile phase. Thus a mobile phase containing a modifier such as methanol will cause a response by the detector. Fully oxidized forms of carbon are not detected therefore carbon dioxide in the mobile phase does not cause a response by the flame-based detector. The methanol is present in the elution from the chromatographic column over an extended time and may increase in content relative to the carbon dioxide according to a desired composition gradient. In contrast, an analyte to be detected elutes from the column after a corresponding retention time and exists in the system flow provided to the detector for a brief time. The response of the flame-based detector to the analyte may not be discernible from the background response due to the methanol which can saturate the detector response. Consequently, flame-based detectors are generally not suitable for mobile phases that include methanol or other organic modifiers. Flame-based detection is sometimes used in subcritical, supercritical and near-supercritical mobile phases, such as in carbon dioxide-based chromatography systems, when organic modifiers are not used in the mobile phase.

Embodiments of an apparatus and method for detecting an analyte in a chromatographic system using a flame-based detector are described herein. These embodiments allow for an organic component added to the mobile phase flowing to a chromatographic column to be separated from one or more analytes in the effluent provided to the flame-based detector. Thus analytes may be detected even though the organic component may be present in an amount much greater than the amount of the analyte. The mobile phase may exist as a gas, a liquid or as a subcritical, near-supercritical or supercritical fluid. In some embodiments, the mobile phase includes carbon dioxide with a liquid modifier.

In various embodiments of a method and an apparatus for detecting an analyte in a chromatographic separation, a chromatographic separation is performed using a mobile phase that includes an organic component such as a liquid modifier in a carbon dioxide mobile phase. This "primary" separation may be performed with a primary separation module such as a chromatographic column. The (first) effluent from the primary separation module is modulated so that a fluidic plug containing an amount of modifier and an analyte peak is provided to a secondary separation module where a secondary separation is performed. For example, the secondary separation module may be a gas chromatography (GC) separation device or another chromatographic column. A (second) effluent from the secondary separation module includes a modifier peak and the analyte peak. Generally the modifier peak is substantially greater than the analyte peak. The two peaks are temporally resolved due to selective retention of the analyte. The (second) effluent is provided to a flame-based detector which is disabled during the time when the modifier peak is received and enabled at least during the time when the analyte peak is received. Thus the analyte can be detected without interference from the modifier response. The modulator can be a thermal modulator, a flow modulator, a loop or a sorbent trap. Examples of flow modulators include a mechanical valve and a solid-state gas switching valve. The loop fills with fluid and then the fluid in the loop is pushed to the secondary separation module. The sorbent trap can include a wall-coated open tubular GC column section or a packed bed (e.g., a trap column). The secondary separation module can include a GC column or may utilize a pure carbon dioxide mobile phase (i.e., no modifier). In some embodiments, the functions of the modulator and the secondary separation column or device are performed using a single device. For example, the (first) effluent from the primary separation can be decompressed onto a length of a wall-coated open tubular GC column to accomplish the modulation and then the GC column can be rapidly heated to perform the secondary separation and generate the (second) effluent. The GC column is heated to a temperature sufficient to desorb the analyte of interest. The rate of temperature change is selected to maximize the separation, that is, to achieve the greatest resolution between the analyte and the co-solvent.

In other embodiments described below, the method includes a repetitive "sampling" of the effluent from the primary separation into a series of secondary separations. For example, alternating traps may be used in which one trap captures a fluidic plug from the primary (first) effluent while the other trap elutes its contents to the flame-based detector. A valve then switches state to reverse the roles of the two traps. The process can proceed by continued switching back and forth between the two states so that a series of fluidic plugs from the primary (first) effluent undergo a secondary separation before passing to the flame-based detector. In contrast to the single heart cut embodiment for detection of a known analyte, this cyclical sampling operation allows the entirety of the primary (first) effluent to be collected for a "comprehensive modulation" and subsequent provisioning of the (second) effluents from the alternating secondary separations to the flame-based detector. The comprehensive modulation is effectively the same as acquiring a series of consecutive heart cuts of the primary (first) effluent.

Figure 1:
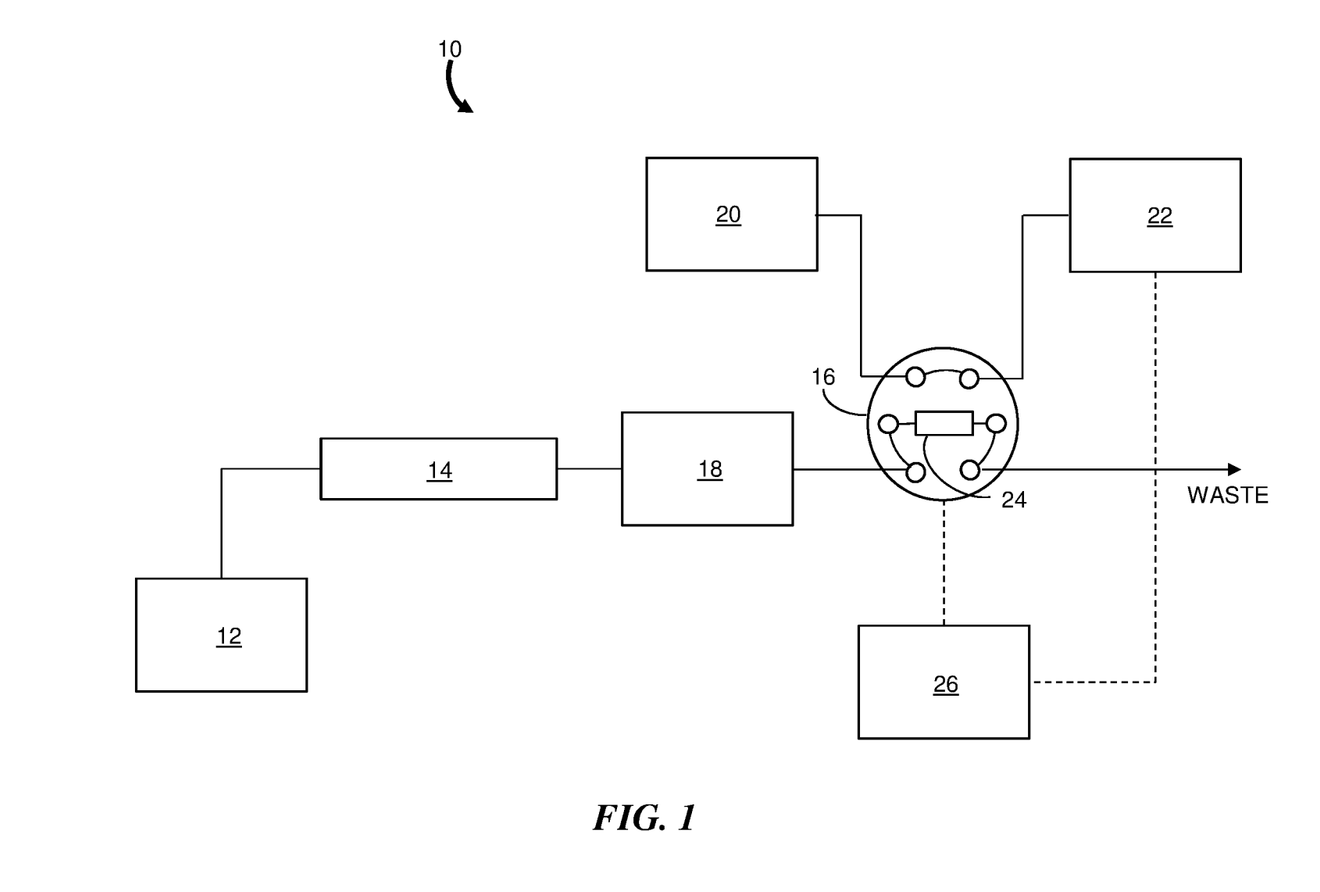
FIG. 1 is a block diagram of an embodiment of a chromatography system that can be used to practice a method for detecting an analyte in a chromatographic system using a flame-based detector.
Figure 2:
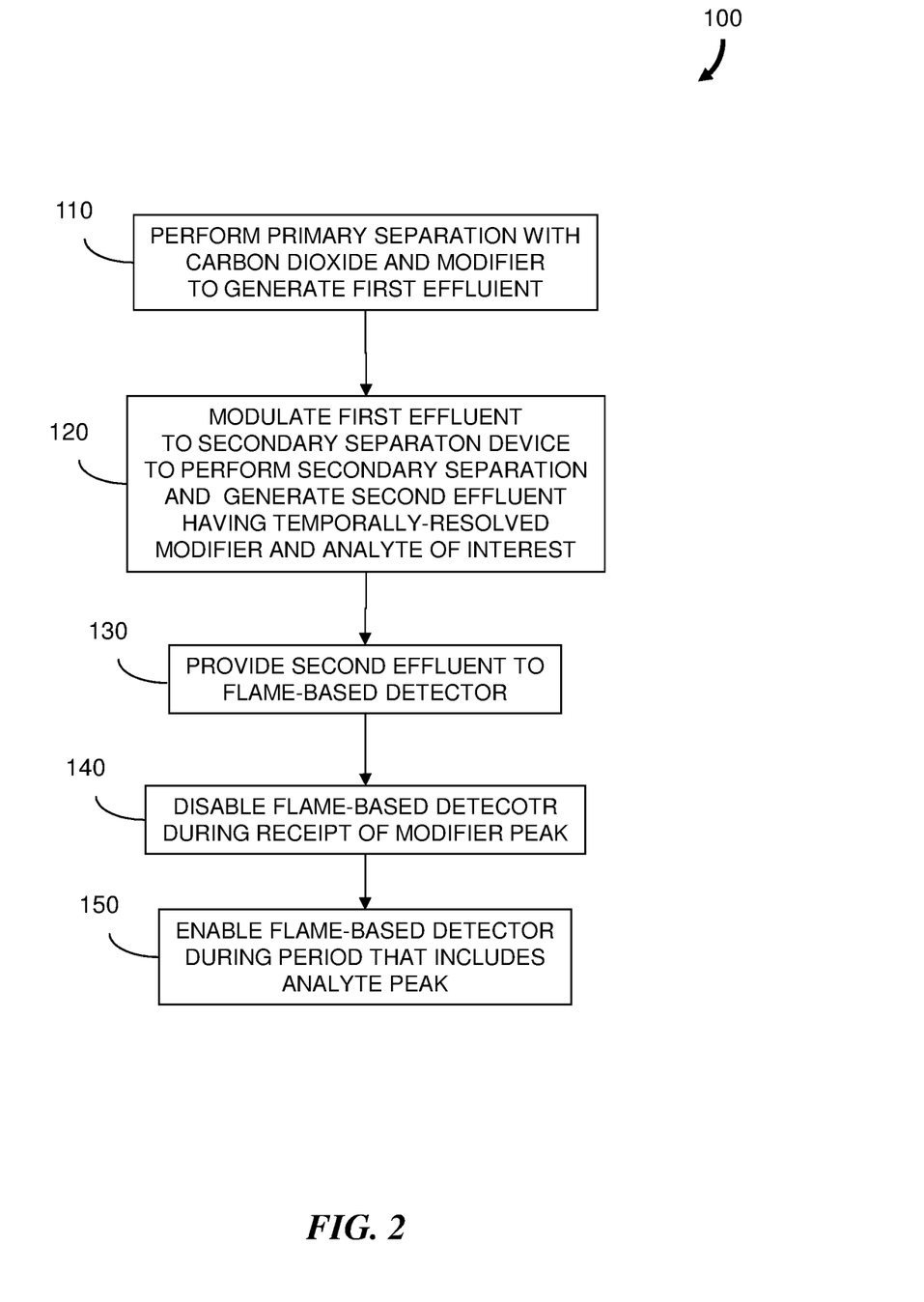
FIG. 2 is a flowchart representation of an embodiment of a method for detecting an analyte in a chromatographic system using a flame-based detector.

FIG. 1 is a block diagram showing a chromatography system 10 that can be used to practice a method 100 for detecting an analyte in a chromatographic system using a flame-based detector and FIG. 2 is a flowchart representation of an embodiment of the method 100. The system 10 includes a source 12 of a mobile phase in fluidic communication with a chromatographic column 14 which in turn is in fluidic communication with a modulator valve 16 through a back pressure regulator 18. In one embodiment, the mobile phase is carbon dioxide which is in a supercritical state, subcritical state or near-supercritical state at the column 14. The system 10 also includes a source 20 of a GC mobile phase and a flame-ionization detector 22, each of which is in fluidic communication with the modulator valve 16. The gas source 20 provides a GC carrier gas such as helium, hydrogen, nitrogen, carbon dioxide or another gas that is compatible with the flame-ionization detector 22. The system further includes a trap 24 that is used to capture a fluidic plug containing modifier and an analyte of interest from the effluent from the column 14 after expansion of the effluent into a gas phase downstream from the back pressure regulator 18. A system controller 26 in communication with the modulator valve 16 and the flame-ionization detector 22 is used to configure the modulator valve 16 in a first state, as shown in the figure, or in a second state as shown in FIG. 3.

In FIG. 1, the chromatography system 10 is shown in a loading configuration. The modulator valve 16 is in the first state in which the carrier gas flows through the modulator valve 16 to the flame-ionization detector 22 while the chromatographic column 14 performs a primary separation (step 110). The effluent from the column 14 passes through the back pressure regulator 18 and decompresses into gaseous carbon dioxide, the liquid modifier and the analyte of interest which flow to the trap 24. The trap 24 acts as a modulator and also acts as a GC separation device. The gaseous carbon dioxide passes through the trap 24 while the liquid modifier and the analyte of interest partition into the trap 24. Optionally, the trap 24 may be cooled to increase the trapping efficiency.

Figure 3:
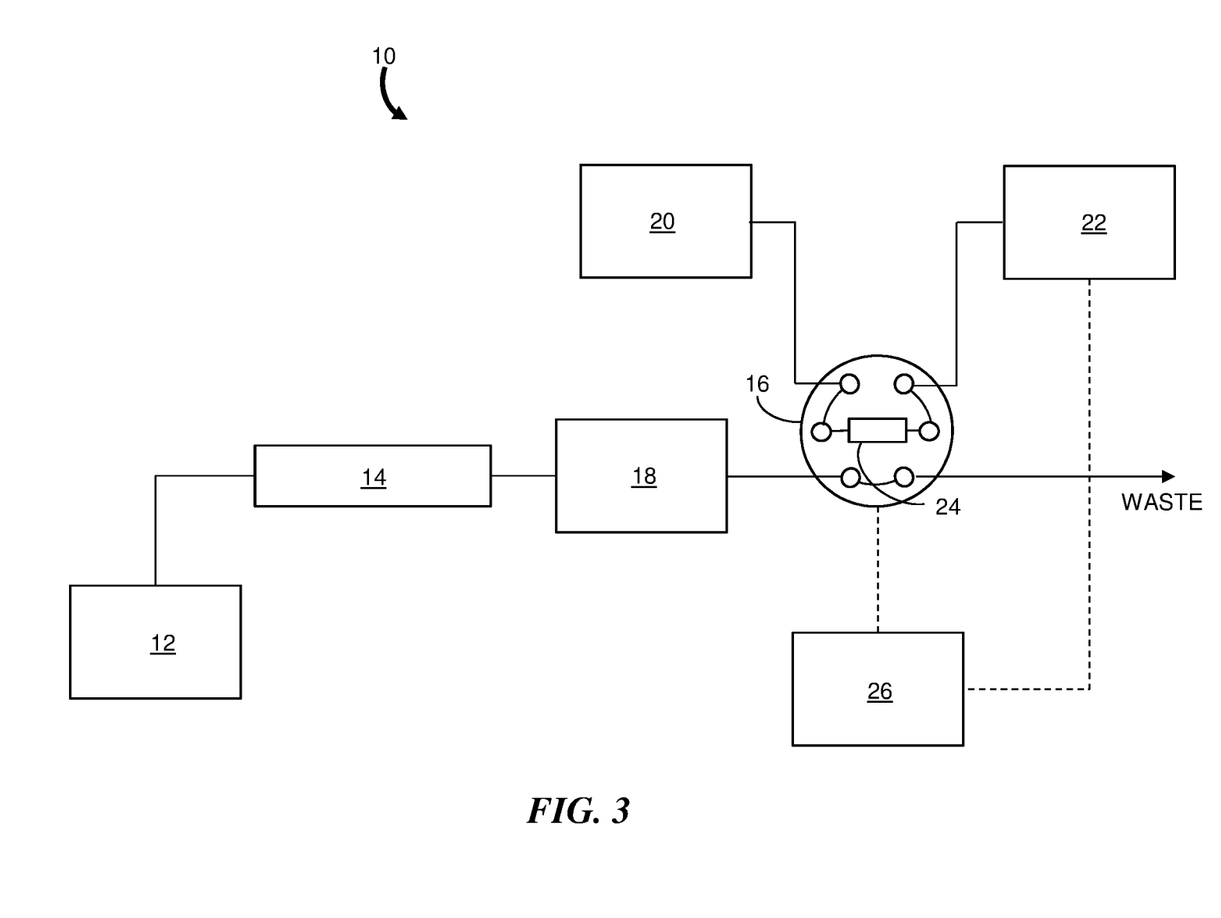
FIG. 3 is a block diagram of the chromatography system of FIG. 1 showing the modulator valve configured in a different state.

After the analyte and modifier are trapped, the modulator valve 16 is switched to the second state as shown in FIG. 3. Optionally, switching may occur in response to a detector (not shown) used to sense the beginning of an analyte peak in the effluent from the column 14. In the second valve state, the trap 24 performs a secondary separation (step 120) where the effluent from the trap is provided (step 130) to the flame ionization detector 22 by flushing the trap 24 with the GC carrier gas. The trap 24 may be heated either isothermally, with a temporal thermal gradient, or with a spatial thermal gradient to improve desorption of the organic modifier and the analyte of interest. Since the modifier is often more volatile than the analyte of interest, the modifier desorbs more quickly than the analyte and the resulting modifier peak is received at the flame-ionization detector 22 before the analyte peak. The flame-ionization detector 22 is disabled (step 140) while the modifier peak is received and subsequently enabled (step 150) to allow detection of the analyte peak.

The trap 24 only has to have a small separation power since only the modifier peak needs to be temporally resolved from the analytes of interest. By way of a non-limiting numerical example, the trap 24 may be a packed bed having a length between about 5 mm and about 5 cm. A GC separation device is generally preferred due to the typical substantially greater volatility of organic modifier relative to most analytes of interest. Due to the low requirement for separation power, the length of the GC device can be small. By way of a non-limiting numerical example, the GC device may be a wall-coated capillary trap of length between about 5 cm to about 50 cm. In other circumstances in which the thermal desorption from the trap 24 is insufficient for separation of the analyte from the modifier, a secondary GC chromatographic column can be used inline with the trap 24 to increase the separation efficiency and to adequately resolve the modifier peak from the analyte peak.

In an alternative embodiment, a carbon dioxide-based separation can be used to desorb the analyte of interest from the trap. This alternative embodiment is particularly useful for analytes of interest that have substantially lower volatility, including analytes of interest that are not sufficiently volatile for GC analysis or analytes of interest that are thermally labile.

Figure 4:
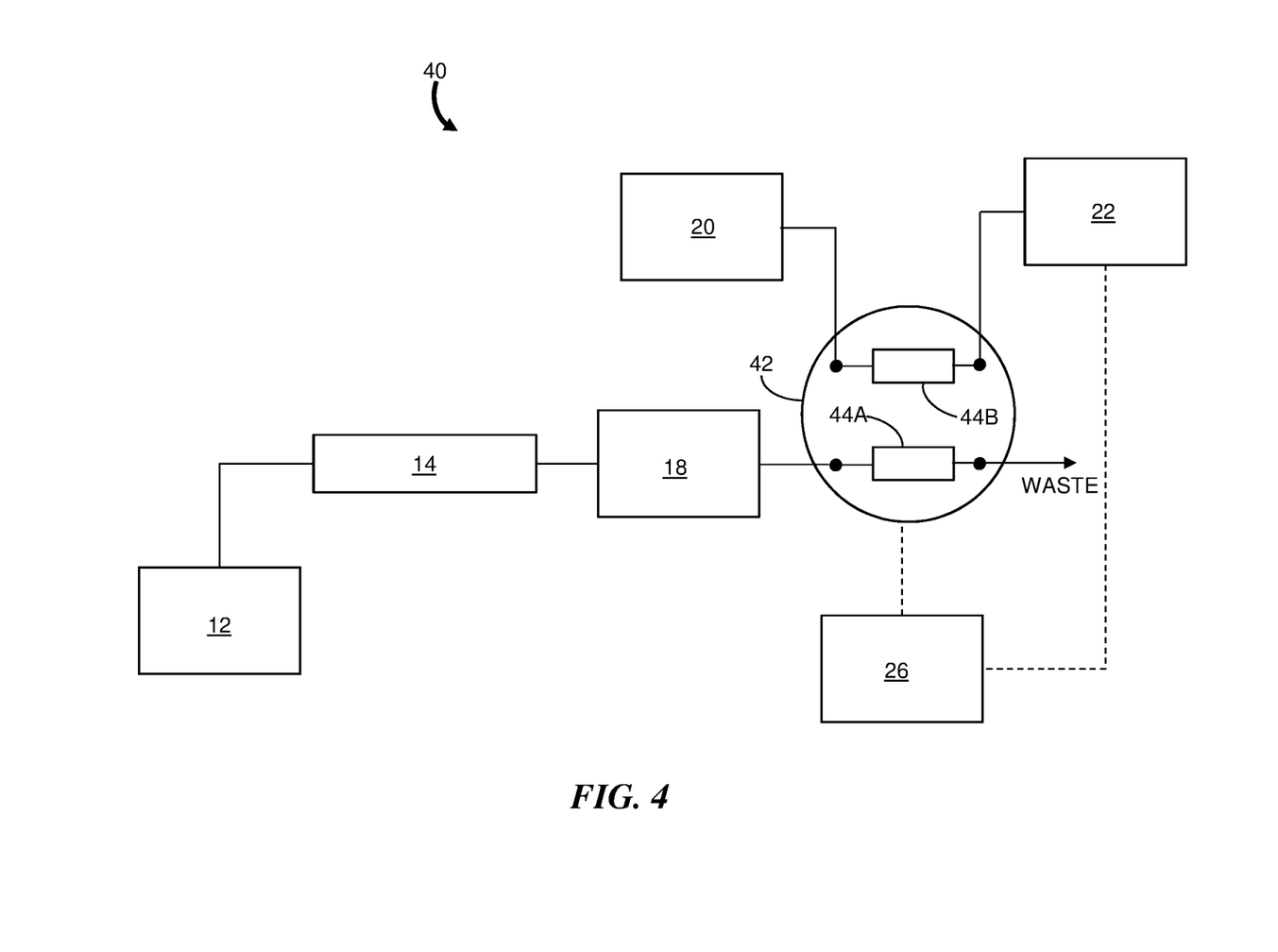
FIG. 4 is a block diagram of an embodiment of a chromatographic system for detecting an analyte in a chromatographic separation.
Figure 5:
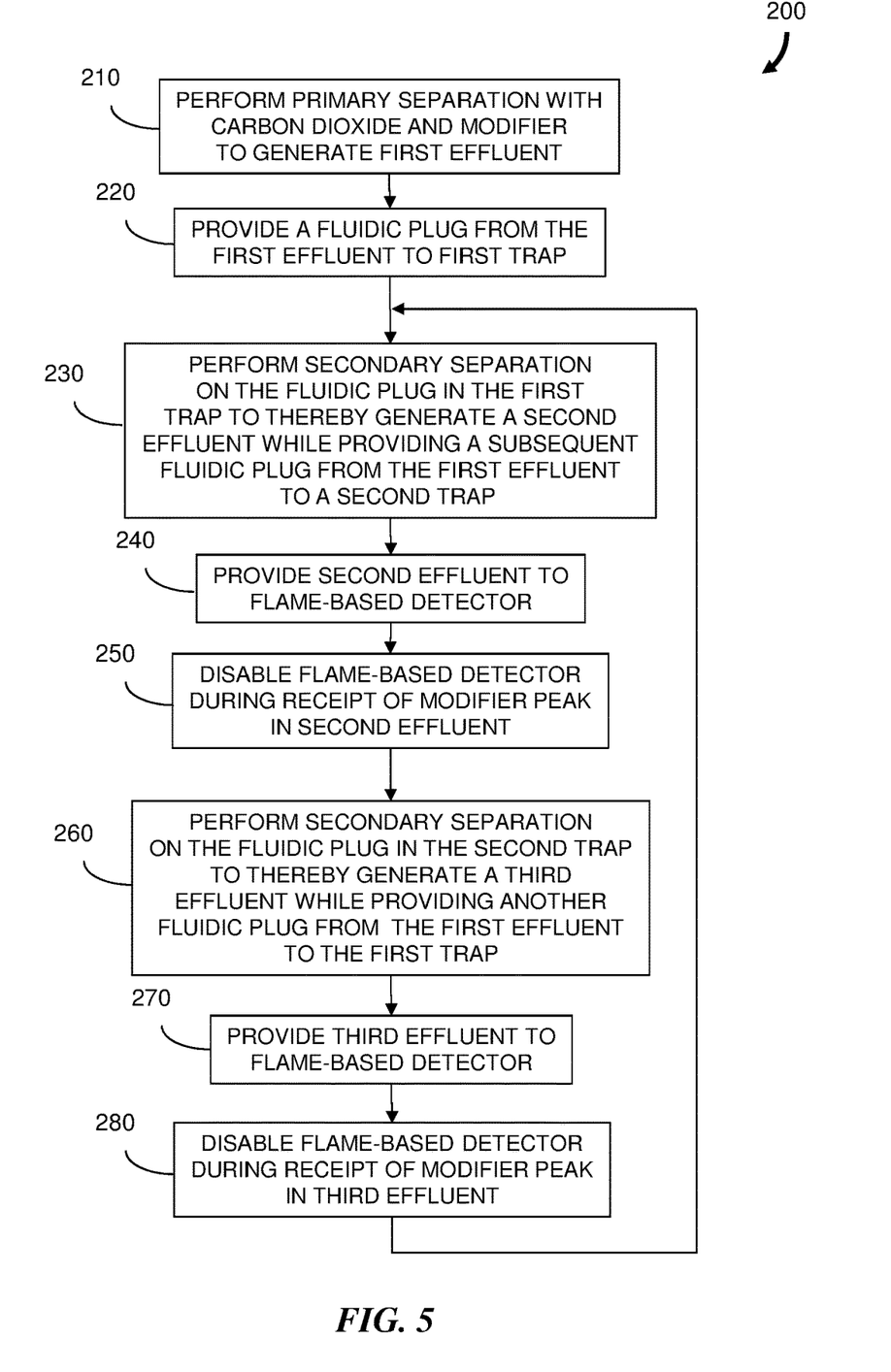
FIG. 5 is a flowchart representation of an embodiment of a method for detecting an analyte in a chromatographic separation.

FIG. 4 and FIG. 5 show a block diagram of an embodiment of a chromatographic system 40 and an embodiment of a method 200, respectively, for detecting an analyte in a chromatographic separation. The chromatographic system 40 includes components similar to those shown in FIG. 1; however, the modulation valve 42 is configured differently and communicates with a first trap 44A and a second trap 44B. In one embodiment, the modulator valve 42 is a ten-port rotary shear seal valve. In alternative embodiments the traps 44 are "replaced" with chromatography columns such as GC columns, LC columns or supercritical fluid chromatography columns.

Unlike the single heart cut analysis implemented by the method 100 (see FIG. 2) described above, the method 200 enables a comprehensive modulation of the first effluent onto the secondary separation module (first and second traps 44) so that a series of fluidic plugs from the first effluent is effectively examined and a plurality of analytes may be detected.

During operation, a primary separation is performed (step 210) with the chromatographic column 14 to generate a first effluent that may contain multiple analyte peaks. The first effluent flows to the modulator valve 42, which is in a first state, so that a fluidic plug from the first effluent is provided (step 220) to the first trap 44A. Since the first trap 44A is downstream from the back pressure regulator 18, the effluent includes carbon dioxide gas which passes through the first trap 44A while the modifier and any analytes in the effluent are captured in the trap 44A. Concurrently, the GC carrier gas flows from its source 20 through the second trap 44B toward the flame ionization detector 22.

Figure 6:
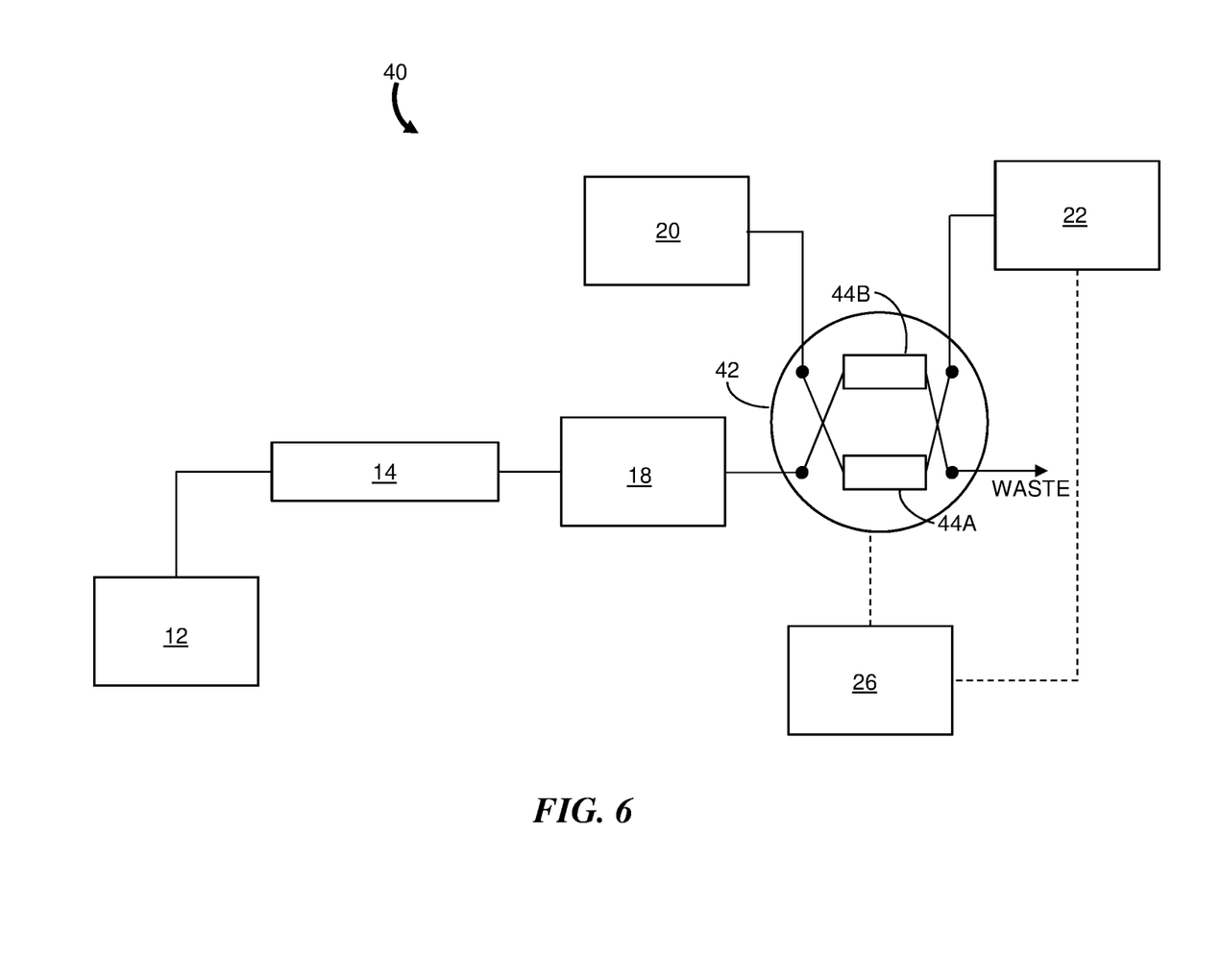
FIG. 6 is a block diagram of the chromatographic system of FIG. 4 showing the modulator valve configured in a different state.

After the modifier and any analytes in the first fluidic plug are acquired in the first trap 44A, the controller 26 configures the modulator valve 42 into a second state as shown in FIG. 6 so that a subsequent fluidic plug in the first effluent now flows to the second trap 44B while the GC carrier gas flow is directed through the first trap 44A. Thus a secondary separation is performed (step 230) on the fluidic plug in the first trap 44A while a next fluidic plug from the first effluent is provided to the second trap 44B. The secondary separation results in a second effluent from the first trap 44A that contains a modifier peak and possibly one or more analyte peaks that are temporally resolved from the modifier peak. The second effluent is provided (step 240) to the flame ionization detector 22. The controller 26 disables (250) the detector 22 during the time when the modifier peak is received to prevent detector saturation and the detector 22 is enabled at other times for detection of any analyte peaks.

The modulator valve 42 is then reconfigured by the controller 26 into the first state so that a secondary separation is performed (step 260) on the fluidic plug in the second trap 44B while the next fluidic plug from the first effluent is provided to the first trap 44A. The secondary separation using the second trap 44B results in a third effluent that contains a modifier peak and may contain one or more analyte peaks that are resolved with respect to the modifier peak. This third effluent is provided (step 270) to the flame ionization detector 22 for the detection of any included analytes. The detector 22 is disabled (step 280) by the controller 26 during the period when the modifier peak is received.

Figure 7:
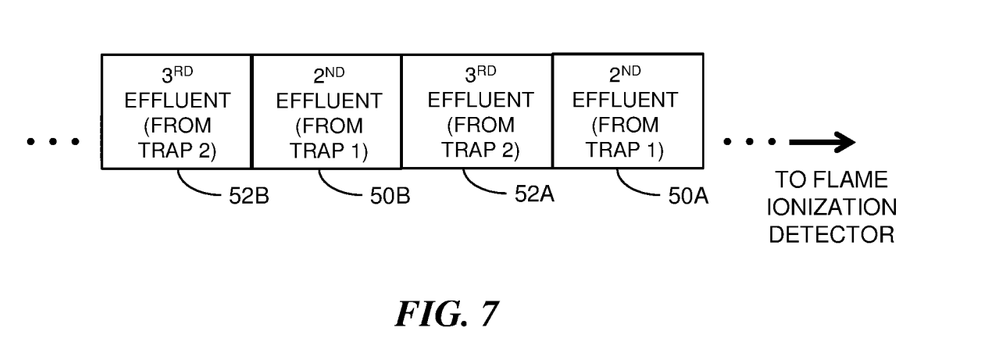
FIG. 7 is a graphical depiction of how contributions of the second effluents and contributions of the third effluents from the first trap and second trap, respectively, of FIGS. 4 and 6 are alternatingly provided to the flame-ionization detector.

The method 200 includes one or more repetitions of steps 230 to 280, with each repetition occurring for a full valve cycle, so that a longer portion of the primary separation can be observed and a greater number of analytes may be detected. Reference is made to FIG. 7 which graphically depicts how contributions of the second effluents 50 and contributions of the third effluents 52 from the first trap 44A and second trap 44B, respectively, are alternatingly provided to the flame-ionization detector 22. With a sufficient number of repetitions (full valve cycles), a piece-wise full chromatogram corresponding to the primary separation can be generated.

In the system 40 and method 200 described above, each of the first and second traps 44 also operate as a GC separation device. In an alternative embodiment, a separate GC separation device may be disposed downstream from a respective trap 44 to provide a modifier peak that is resolved from any analyte peaks or to further separate the modifier peaks from the analyte peaks. In another alternative embodiment, the method 200 is modified to include additional "parallel processing" of fluidic plugs from the first effluent, for example, by using one or more additional traps and/or valves.

Figure 8:
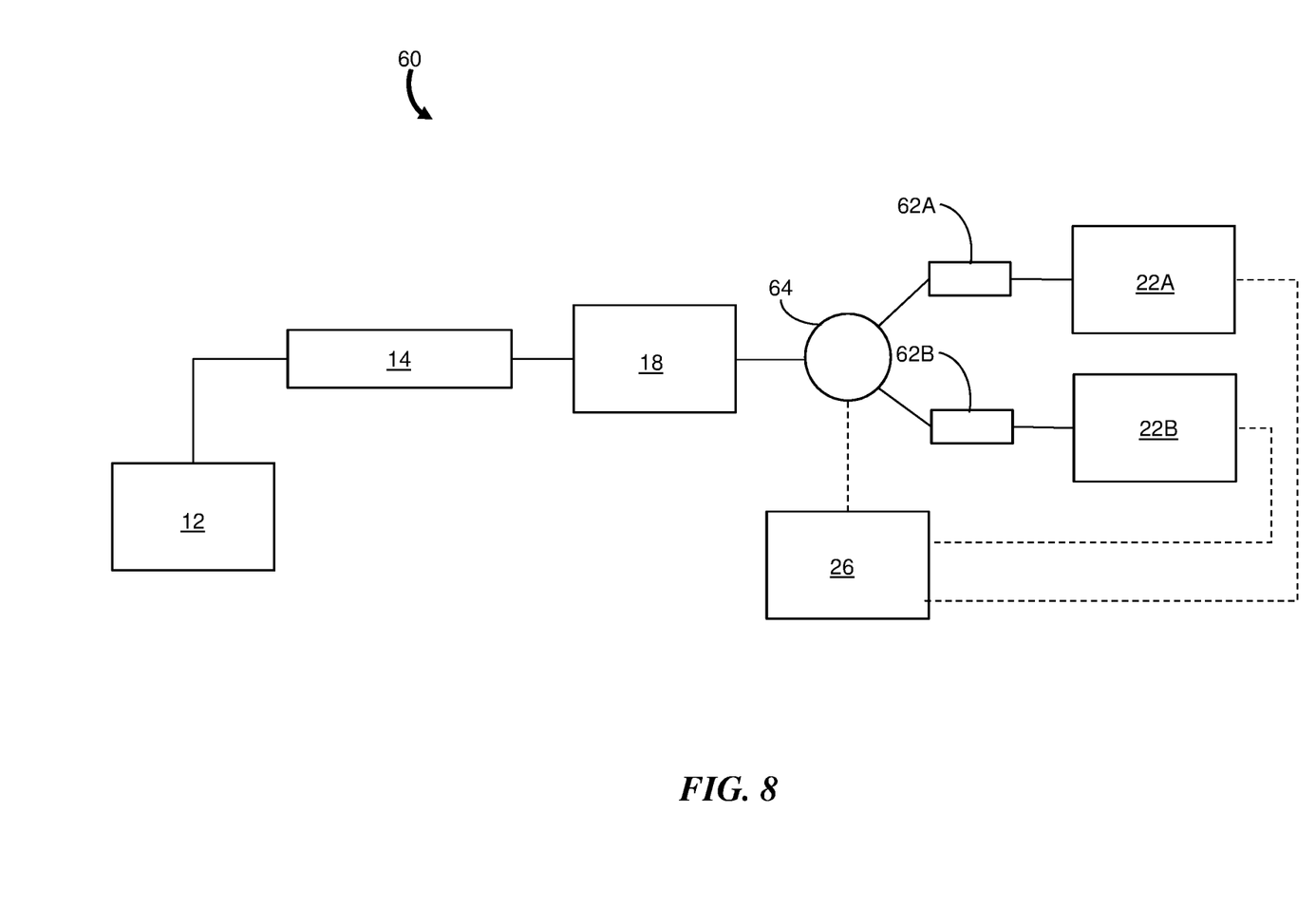
FIG. 8 is a block diagram of another embodiment of a chromatographic system for detecting an analyte in a chromatographic separation.

FIG. 8 is a block diagram of an alternative embodiment of a chromatographic system 60 for detecting an analyte in a chromatographic separation. The system includes components that are similar to those described above with respect to the system 40 of FIG. 4; however, there are two GC columns 62 having independent heating control. The modulator 64 may be, for example, a mechanical valve or a solid-state gas switching valve. The effluents from the GC columns 62A and 62B are received at flame ionization detectors 22A and 22B, respectively. The modulator 64 operates in a cyclical manner and a piece-wise full chromatogram corresponding to the primary separation can be generated from the signals provided by the two detectors 22.

In other embodiments, other types of modulators may be employed. For example, a cryogenic modulator can be used to modulate a single GC column to achieve better focusing at the head of the column. This type of modulation is particularly suitable for a helium gas mobile phase.

In another embodiment, a pair of sample loops may be used upstream of the secondary separation module. The modulator executes a comprehensive modulation process by providing segments of the effluent from the primary separation module in an alternating manner to the sample loops. A GC mobile phase gas "pushes" the contents of one loop to the secondary separation module while the other loop receives a segment of the effluent from the primary separation module.

In still another embodiment, a stop flow modulation is performed. For example, a valve can be used at the outlet of the back pressure regulator to stop the flow of effluent from the primary separation module. The valve is then opened briefly to permit a brief flow of the effluent to the secondary separation module. The valve is cycled to comprehensively modulate the effluent flow to the secondary separation module to thereby enable a piece-wise chromatogram to be obtained.

Although various embodiments described above related to chromatography systems in which the mobile phase is subcritical or supercritical state at the column, it will be appreciated that in other embodiments the method and apparatus are directed to other types of chromatography systems. By way of example, such liquid chromatography systems include those that use water or certain other liquids as a mobile phase and are compatible with a flame-based detector. Examples of organic components that may be used in such systems include acetonitrile and methanol.

While the invention has been shown and described with reference to specific embodiments, it should be understood by those skilled in the art that various changes in form and detail may be made therein without departing from the scope of the invention as defined by the following claims.

The invention claimed is:

1. A method for detecting an analyte in a chromatography system using a flame-based detector, the method comprising:
performing a primary separation using a first mobile phase having a composition that includes an organic component, the primary separation generating a first effluent that includes the organic component and an analyte peak;
performing a secondary separation on a fluidic plug from the first effluent that includes the analyte peak, the secondary separation generating a second effluent that includes an organic component peak and the analyte peak, wherein the organic component peak and the analyte peak are temporally resolved;
providing the second effluent to a flame-based detector;
disabling the flame-based detector during a time when the organic component peak is received; and
enabling the flame-based detector during a time when the analyte peak is received.

2. The method of claim 1 wherein the organic component is a modifier.

3. The method of claim 1 wherein the organic component is an organic component from a group of organic components consisting of methanol, ethanol, isopropanol and acetonitrile.

4. The method of claim 1 wherein performing the secondary separation comprises switching a valve to direct the fluidic plug to a gas chromatography separation device.

5. The method of claim 4 wherein performing the secondary separation further comprises heating the gas chromatography separation device.

6. An apparatus for detecting an analyte in a chromatography system using a flame-based detector comprising:
a flame-based detector;
a primary separation module;
a secondary separation module having an outlet in communication with the flame-based detector;
a modulator having an inlet in communication with the primary separation module and an outlet in communication with an inlet of the secondary separation module; and
a controller in communication with the flame-based detector and the modulator, the controller configuring the modulator to provide a fluidic plug from a first effluent from the primary separation module that contains an analyte peak and an organic component to the secondary separation module, wherein the secondary separation module generates a second effluent having an organic component peak and the analyte peak, wherein the organic component peak and the analyte peak are temporally resolved and wherein the controller is configured to disable the flame-based detector during a time when the organic component peak is received at the flame-based detector and to enable the flame-based detector during a time when the analyte peak is received at the flame-based detector.

7. The apparatus of claim 6 wherein the organic component is a modifier.

8. The apparatus of claim 6 wherein the secondary separation module is a gas chromatography column.

9. The apparatus of claim 6 wherein the secondary separation module includes a source of a gas mobile phase.

10. The apparatus of claim 6 wherein the secondary separation module is a packed column.

11. The apparatus of claim 6 wherein the secondary separation module includes a source of a carbon dioxide mobile phase.

12. The apparatus of claim 6 wherein the modulator is one of a thermal modulator, a flow modulator, a trap and a loop.

13. The apparatus of claim 6 wherein the modulator and the secondary separation module are integrated as a single device.

14. The apparatus of claim 6 wherein the modulator comprises a valve having at least a first state and a second state, wherein the fluidic plug from the first effluent is directed to flow to the secondary separation module during the first state and the first effluent is prevented from flowing to the secondary separation module while in the second state.

15. The apparatus of claim 6 wherein the flame-based detector is one of a flame ionization detector and a flame photometric detector.

16. An apparatus for detecting an analyte in a chromatography system using a flame-based detector comprising:
a flame-based detector;
a first trap and a second trap;
a first gas chromatography separation device and a second gas chromatography separation device each in fluidic communication with the flame-based detector;
a modulator valve in fluidic communication with the first and second traps and the first and second gas chromatography separation devices, the modulator valve configured to receive a first effluent from a chromatographic column at a first port and to receive a gas chromatography carrier gas at a second port, the modulator valve switchable between a first state in which the first effluent is directed to flow into the first trap and the gas chromatography carrier gas is directed to flow through the second trap to the second gas chromatography separation device and a second state in which the first effluent is directed to flow into the second trap and the gas chromatography carrier gas is directed to flow through the first trap to the first gas chromatography separation device; and
a controller in communication with the flame-based detector and the modulator valve, the controller configured to switch the modulator valve between the first state and the second state.

17. The apparatus of claim 16 wherein the gas chromatography separation device is a gas chromatography column.

18. The apparatus of claim 16 wherein the controller is configured to disable the flame-based detector during a first duration of each of the first and second effluents when an organic component peak is received at the flame-based detector and to enable the flame-based detector during a second duration of each of the first and second effluents when an analyte peak is received at the flame-based detector.

19. The apparatus of claim 16 wherein the flame-based detector is one of a flame ionization detector and a flame photometric detector.

20. The apparatus of claim 16 wherein the first and second gas chromatography separation devices are integral with the first and second traps, respectively, and wherein the modulator valve is configured in the first state to direct the gas chromatography carrier gas through the second trap directly to the flame-based detector and configured in the second state to direct the gas chromatography carrier gas through the first trap directly to the flame-based detector.

* * * * *